US010216543B2

(12) United States Patent
Singh et al.

(10) Patent No.: US 10,216,543 B2
(45) Date of Patent: Feb. 26, 2019

(54) REAL-TIME ANALYTICS BASED MONITORING AND CLASSIFICATION OF JOBS FOR A DATA PROCESSING PLATFORM

(71) Applicant: MityLytics Inc., Alameda, CA (US)

(72) Inventors: Maneesh Kumar Singh, Alameda, CA (US); Hrishikesh Pradeep Divate, Pune (IN)

(73) Assignee: Mitylytics Inc., Alameda, CA (US)

( * ) Notice: Subject to any disclaimer, the term of this patent is extended or adjusted under 35 U.S.C. 154(b) by 19 days.

(21) Appl. No.: 15/234,637

(22) Filed: Aug. 11, 2016

(65) Prior Publication Data

US 2017/0046203 A1 Feb. 16, 2017

Related U.S. Application Data (60) Provisional application No. 62/205,441, filed on Aug. 14, 2015.

(51) Int. Cl.
*G06F 9/46* (2006.01)
*G06F 9/50* (2006.01)
*G06N 99/00* (2010.01)

(52) U.S. Cl.
CPC ......... *G06F 9/5027* (2013.01); *G06N 99/005* (2013.01)

(58) Field of Classification Search
CPC .......................................................... G06F 9/52
USPC ........................................................ 718/104
See application file for complete search history.

(56) References Cited

U.S. PATENT DOCUMENTS

| 6,591,262 | B1 * | 7/2003 | MacLellan | G06Q 10/06 |
| 6,859,926 | B1 * | 2/2005 | Brenner | G06F 9/5038 |
| | | | | 718/100 |
| 9,459,930 | B1 * | 10/2016 | Adogla | G06F 9/52 |
| 2005/0010608 | A1 * | 1/2005 | Horikawa | G06F 9/4862 |
| 2005/0154860 | A1 * | 7/2005 | Arimilli | G06F 11/3466 |
| | | | | 712/216 |
| 2005/0154861 | A1 * | 7/2005 | Arimilli | G06F 9/5011 |
| | | | | 712/216 |
| 2005/0183084 | A1 * | 8/2005 | Cuomo | G06F 9/505 |
| | | | | 718/100 |
| 2008/0109270 | A1 * | 5/2008 | Shepherd | G06Q 10/06 |
| | | | | 705/7.26 |
| 2009/0326728 | A1 * | 12/2009 | Chrisop | G06F 1/3203 |
| | | | | 700/295 |

(Continued)

*Primary Examiner* — Mehran Kamran
(74) *Attorney, Agent, or Firm* — Fountainhead Law Group P.C.

(57) ABSTRACT

In one embodiment, a method selects a new job to schedule for execution on a data processing system. The new job includes a. Performance information for a set of current jobs that are being executed in the data processing system is retrieved where the set of jobs are assigned to queues and currently classified with a current classification. The method analyzes the performance information to determine when one or more current jobs in the set of current jobs should be re-classified due to resource usage of a respective current job when being executed in the data processing system and re-classifies the classifications for the one or more current jobs in the queues. Then, the new job is assigned to one of the queues based on the classification of the new job and the classifications of jobs in the queues including the re-classified classifications for the one or more current jobs.

20 Claims, 7 Drawing Sheets

(56) References Cited

U.S. PATENT DOCUMENTS

| | | | | |
|---|---|---|---|---|
| 2010/0082513 A1* | 4/2010 | Liu | ................... | H04L 63/1458 |
| | | | | 706/46 |
| 2011/0083131 A1* | 4/2011 | Pirzada | ............... | G06F 9/45533 |
| | | | | 718/1 |
| 2012/0260256 A1* | 10/2012 | De Faria | ............... | G06F 9/5011 |
| | | | | 718/103 |
| 2013/0185729 A1* | 7/2013 | Vasic | ................... | G06F 9/5072 |
| | | | | 718/104 |
| 2013/0232254 A1* | 9/2013 | Srikanth | ............ | H04L 43/0876 |
| | | | | 709/224 |
| 2014/0059561 A1* | 2/2014 | Grasselt | ............. | G06F 11/3419 |
| | | | | 718/104 |
| 2014/0380320 A1* | 12/2014 | Lin | ...................... | G06F 9/4881 |
| | | | | 718/102 |
| 2015/0154713 A1* | 6/2015 | Diaz | ..................... | G06Q 40/08 |
| | | | | 705/4 |
| 2015/0178135 A1* | 6/2015 | Wang | ................... | G06F 9/5027 |
| | | | | 718/104 |
| 2015/0212741 A1* | 7/2015 | Lee | ...................... | G06F 3/0613 |
| | | | | 711/114 |
| 2015/0286507 A1* | 10/2015 | Elmroth | ............. | G06F 11/3442 |
| | | | | 718/104 |
| 2015/0365309 A1* | 12/2015 | Kaminski | ............... | H04L 47/70 |
| | | | | 709/224 |
| 2016/0127255 A1* | 5/2016 | Cobb | ....................... | G06F 9/46 |
| | | | | 709/226 |

* cited by examiner

REAL-TIME ANALYTICS BASED MONITORING AND CLASSIFICATION OF JOBS FOR A DATA PROCESSING PLATFORM

CROSS REFERENCE TO RELATED APPLICATIONS

The present disclosure claims priority to U.S. Provisional App. No. 62/205,441, entitled "REAL-TIME ANALYTICS BASED MONITORING, SIMULATION AND OPTIMIZATION (TUNING) FOR BIG DATA PLATFORM INFRASTRUCTURE", filed Aug. 14, 2015, the contents of which is incorporated herein by reference in its entirety.

BACKGROUND

Big Data platforms are typically implemented in data centers located in multiple locations each of which may provide one or more of computational resources, networking resources, and storage resources. Big Data platforms continuously run different jobs or tasks that use the resources. The platform uses resource managers to allocate resources and schedulers to schedule jobs or tasks for applications based on the allocated resources. The allocation may be preset based on the specific task. Also, once the allocation decision is made, the task typically runs to completion on the resources that were allocated. Since there may be many tasks being run and also started on the resources, the resource usage conditions may be constantly changing. This may cause the execution of the task to be adversely affected if the resources become overloaded with executing other tasks.

SUMMARY

In one embodiment, a method selects a new job to schedule for execution on a data processing system. The new job includes a classification in a plurality of classifications. Performance information for a set of current jobs that are being executed in the data processing system is retrieved where the set of jobs are assigned to a plurality of queues and currently classified with a current classification in the plurality of classifications. The method analyzes the performance information to determine when one or more current jobs in the set of current jobs should be re-classified due to resource usage of a respective current job when being executed in the data processing system and re-classifies the classifications for the one or more current jobs in the plurality of queues. Then, the new job is assigned to one of the queues based on the classification of the new job and the classifications of jobs in the plurality of queues including the re-classified classifications for the one or more current jobs.

In one embodiment, a non-transitory computer-readable storage medium contains instructions, that when executed, control a computer system to be configured for: selecting a new job to schedule for execution on a data processing system, the new job including a classification in a plurality of classifications; retrieving performance information for a set of current jobs that are being executed in the data processing system, wherein the set of jobs are assigned to a plurality of queues and currently classified with a current classification in the plurality of classifications; analyzing the performance information to determine when one or more current jobs in the set of current jobs should be re-classified due to resource usage of a respective current job when being executed in the data processing system; re-classifying the classifications for the one or more current jobs in the plurality of queues; and assigning the new job to one of the queues based on the classification of the new job and the classifications of jobs in the plurality of queues including the re-classified classifications for the one or more current jobs.

In one embodiment, an apparatus includes: one or more computer processors; and a non-transitory computer-readable storage medium comprising instructions, that when executed, control the one or more computer processors to be configured for: selecting a new job to schedule for execution on a data processing system, the new job including a classification in a plurality of classifications; retrieving performance information for a set of current jobs that are being executed in the data processing system, wherein the set of jobs are assigned to a plurality of queues and currently classified with a current classification in the plurality of classifications; analyzing the performance information to determine when one or more current jobs in the set of current jobs should be re-classified due to resource usage of a respective current job when being executed in the data processing system; re-classifying the classifications for the one or more current jobs in the plurality of queues; and assigning the new job to one of the queues based on the classification of the new job and the classifications of jobs in the plurality of queues including the re-classified classifications for the one or more current jobs.

The following detailed description and accompanying drawings provide a better understanding of the nature and advantages of particular embodiments.

DETAILED DESCRIPTION

Described herein are techniques for a scheduling system for a data processing platform. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments correlate, using statistical methods, performance information from a data processing platform to resources in the platform, such as compute, network, memory, and storage elements. An analytics engine analyzes performance information from compute elements, storage elements, memory elements and network elements. The system then uses the performance information from the analytics engine to classify or re-classify jobs that are scheduled on the data processing platform.

Figure 1:
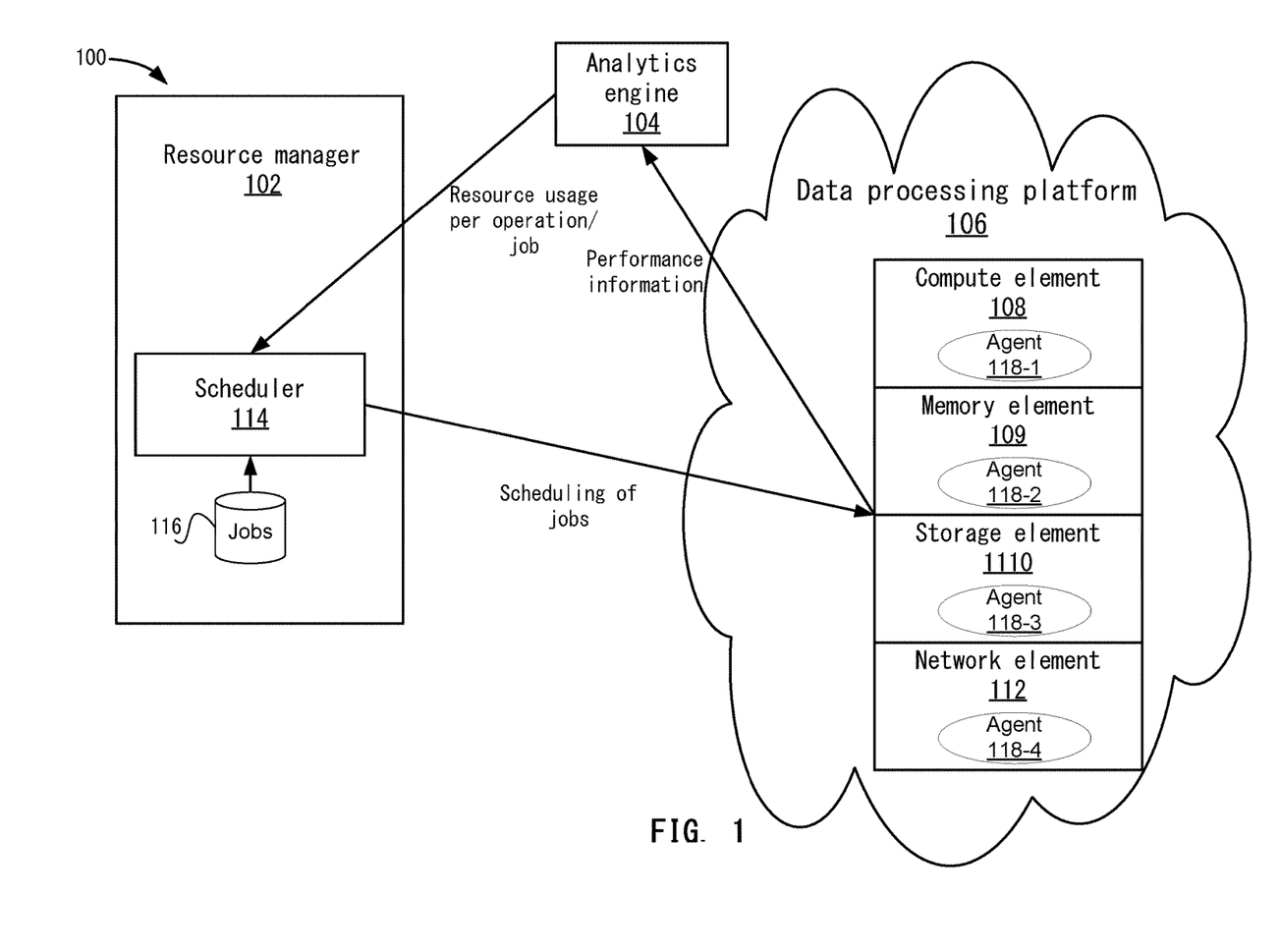
FIG. 1 depicts a simplified system for scheduling jobs according to one embodiment.

FIG. 1 depicts a simplified system 100 for scheduling jobs according to one embodiment. System 100 includes a resource manager 102, an analytics engine 104, and a data processing platform 106. Data processing platform 106 includes various resources (e.g., data processing elements), such as compute elements 108, memory elements 109, network elements 110, and storage elements 112, that perform jobs. Compute elements 108 may include central processing unit (CPU) elements, memory elements 109 may include random access memory (RAM) and other in memory elements, network elements 110 may include switches and other networking elements, and storage elements 112 may include database elements that store data persistently. Other computing resources may also be appreciated.

Resource manager 102 includes a scheduler 114 that schedules jobs on data processing platform 106. The jobs use various data processing elements in data processing platform 106. In one embodiment, a job may include tasks that need to be performed by an application running on a compute element 108. This job may also use memory elements 109, network elements 110 and/or storage elements 112 when being executed by compute element 108. In one embodiment, different jobs use different amounts of data processing elements in platform 106. For example, some jobs may use more resources of storage elements 112 and some jobs may use more resources of compute elements 108.

In one embodiment, each element in platform 106 includes an agent 118, such as a compute element includes an agent 118-1, a network element 110 includes an agent 118-2, a storage element 112 includes an agent 118-3, and a memory element 109 includes an agent 118-3. When jobs are performed on data processing platform 106, agents 118 may measure performance information. The monitoring can be performed due to agent 118 being installed on each element. In one embodiment, agents 118 can read a per-job usage of resources at any given time. Agents 118 then send the performance information to analytics engine 104. Some performance information that is measured includes CPU utilization, memory utilization, CPU usage, file descriptors in use, interrupts from input/output (I/O) devices, sockets in use and socket states for compute elements 108, job tracking, application tracking, task tracking from storage elements 112, network flow statistics, flow counters, queue counter switch keys, and routing and switching controls for databases from network elements 110. In one embodiment, storage performance is analyzed by gathering input/output performance statistics (IOPS). IOPS are correlated with state of flows in the analytics engine to analyze the performance of the network. Analytics engine 104 may use this information to generate a summary of each resource used. For example, compute resources are summarized in an amount of CPU used, memory resources in an amount of memory used, storage resources in an amount of storage used, and network resources in an amount of bytes transferred.

Agents 118 report each resource's usage, which may be expressed as usage/job in a list. In one embodiment, the information may be expressed in the following format:
1. network_usage=job_remaining["network"]
2. cpu_usage=job_remaining["cpu"]
3. memory_usage=job_remaining["memory"]
4. disk_usage=job_remaining["disk_usage"]

This usage data indicates the percentage of a job remaining in each resource dimension (network (network_usage), cpu (cpu_usage), memory (memory_usage), and disk usage (disk_usage)). The percentage is determined by comparing a ratio of the amount of each resource used up until the current time by the job to each respective resource's total predicted resource usage.

A management console may be used to configure and deploy agents. For example, agents may be installed strategically in various locations on data processing platform 106, such as in compute elements 108, network elements 110, and storage elements 112. During installation, agents 118 may register with the management console so they can be configured and managed.

Agents 118 collect performance information that includes metrics for the jobs being executed on elements of platform 106. The data may be produced periodically and sent to analytics engine 104. Each message may contain a timestamp, information describing which part of platform 106 the agent belongs to, the job the performance information is associated with, and parameter names and values that have been collected. The parameter names may be different measurements of resources used.

Analytics engine 104 may then index and store performance information. This allows the ability to search and perform analytics on the data sets. Additionally, this stores the information for scheduler 114, which may use the performance information to re-classify jobs as will be described in more detail below. As will be described in more detail below, the re-classification uses the dominant resource and dominant operations used by a job to re-classify the job. Analytics engine 104 may process the performance information such that the dominant resource and dominant operations that are used by a job can be determined.

Scheduler 114 schedules the jobs based on performance information from analytics engine 104. For example, scheduler 114 may schedule jobs based on a classification associated with the jobs. The jobs may be given an initial classification. Then, using the performance information from analytics engine 104, scheduler 114 may determine whether a job should be re-classified. For example, depending on the resources used, scheduler 114 may determine whether or not a job classified as a memory job should be re-classified as a compute job. This reclassification process will be described in more detail below. When new jobs are scheduled, scheduler 114 can then schedule the new job in an appropriate queue based on the re-classified jobs. As will be discussed in more detail below, the re-classification of jobs in the queues allows for a more efficient scheduling of new jobs and more efficient use of resources in platform 106. The classification process will now be described in more detail below.

Classification

Figure 2:
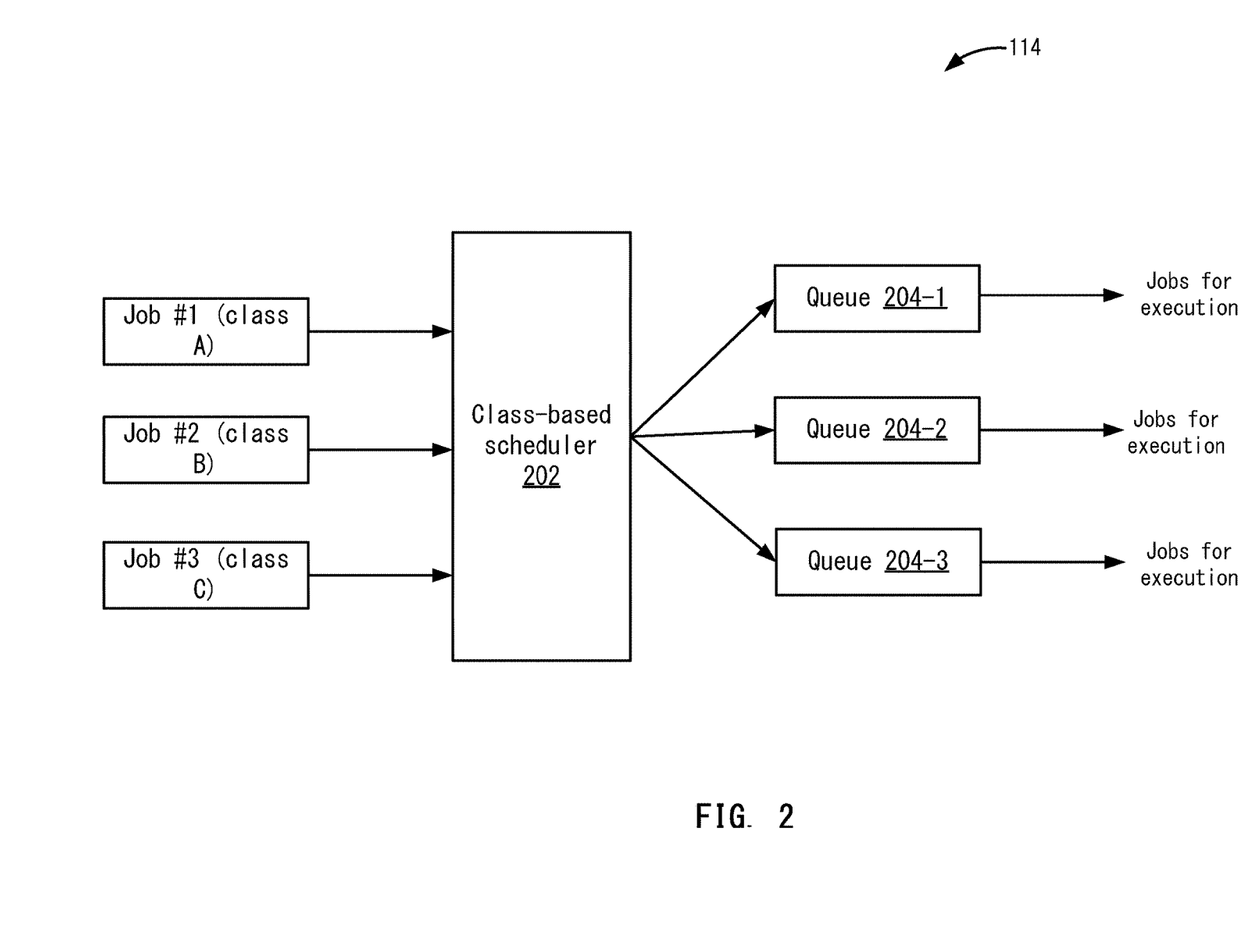
FIG. 2 shows a more detailed example of a scheduler according to one embodiment.

FIG. 2 shows a more detailed example of scheduler 114 according to one embodiment. Scheduler 114 includes a class-based scheduler 202 that can schedule jobs based on the classification of each job. Class-based scheduler 202 receives jobs such as job #1, job #2, and job #3. These are jobs that need to be scheduled in data processing platform 106. As discussed above, the jobs may be classified based on the resources used in data processing platform 106. The classifications may include a compute element class, memory element, network element class, or storage element class. These classes may be abbreviated as class A, class B, and class C in the figure. The classification may be based on which element may be predicted to be used most by the job, which is also known as the dominant resource. In this case, the job may be thought of as being bound for a network element if classified in the network element class, bound for a storage element if classified in the storage element class, etc.

The jobs may be initially classified. For example, the initial classification may be based on a look-up table that indicates which classification should be assigned to jobs. For example, the job classification may be initially assigned to each job, and class-based scheduler 202 may use a job identifier to look up the classification in look-up table for the job. For example, each job is assigned to a class depending on the dominant resource used by the job from past history of execution for the same job. This initial classification is arrived at by looking at the dominant resource usage and/or the dominant operations in the case of jobs that have previously run. If a new job is submitted, the classification may be determined by looking at the resource specification of the job, such as what is the dominant resource or operations specified by the job.

In another embodiment, if the job is not classified yet, job characteristics for the job may be input into a job class predictor, which can then predict the classification for the job. To improve the accuracy of the job class predictor, performance information from jobs that have been run in platform 106 may be used to train a model that the predictor uses. As more jobs are run in platform 106, the more accurate the predictor may become in predicting initial classifications for jobs. The classification may be stored in memory.

Class-based scheduler 202 performs two functions. The first is assigning jobs to different queues 204-1-204-3 based on classifications. Then, class-based scheduler 202 schedules jobs from queues 204-1-204-3 for execution on platform 106. Although three queues are shown, it will be understood that different numbers of queues may be used. Each queue may queue jobs for data processing platform 106. That is, class-based scheduler 202 adds jobs to different queues 204. Then, those jobs wait in the queues until they are retrieved for execution on data processing platform 106. In one embodiment, the queues may be first in-first out (FIFO), but other algorithms for retrieving jobs from the queues may be appreciated. The jobs are admitted to the queues in an unexecuted state when not being executed by platform 106 and then they move to a running state when the jobs begin executing on platform 106 while still retaining their affinity to the queue. Each queue has its own capacity in terms of the resources that can be admitted to the queue. The jobs are assigned to the queues based on the best fit amongst the jobs ready to run, which increases the chance that a job in a queue may be scheduled for execution.

As mentioned above, to have more efficient use of resources, the different classes of jobs should be balanced in each queue. That is, scheduler 114 does not want to have all compute-bound jobs in a single queue since this may result in a compute job not being scheduled due to compute resources running out (either for that queue or in platform 106) or compute resources being low such that jobs take longer times to finish. In one embodiment, a queue has specific quantities of resources allocated to it, such as x amount of compute resources, Y amount of storage resources, etc. are assigned to queue. So jobs from 3 different queues can be running in parallel and there is no arbitration amongst queues, but instead the arbitration is amongst the jobs submitted to a queue so that the resources of a queue are well utilized if the jobs in a queue belong to different classes. To keep this balance a job can hop onto another queue when jobs ahead of it are reclassified.

Figure 3:
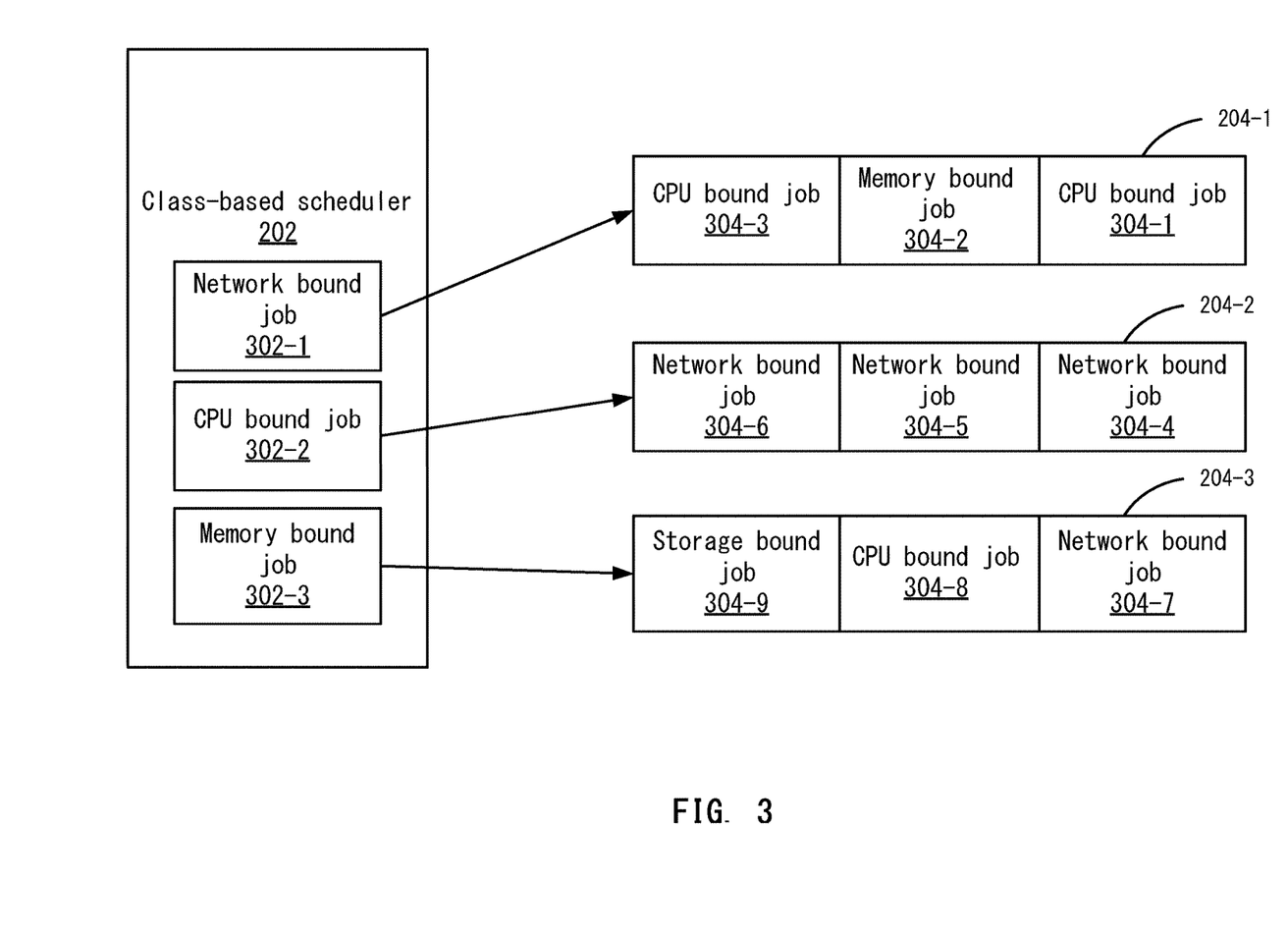
FIG. 3 depicts an example of scheduling different classes of jobs in queues 204 according to one embodiment.

FIG. 3 depicts an example of scheduling different classes of jobs in queues 204 according to one embodiment. Class-based scheduler 202 includes three jobs 302-1, 302-2, and 302-3. Job 302-1 is a network-bound job that is predicted to use more network elements 110; job 302-2 is a CPU-bound job that is predicted to use more compute elements 108; and job 302-3 may be a memory-bound job that is predicted to use more compute elements 108. Additionally, although not shown, a storage-bound job may be bound for storage element 112. Although class-based scheduler 202 does not have to schedule a storage-bound job presently; however, a storage-bound job may be included in a queue 204.

Queues 204 may have different classes of jobs already queued. For example, queue 204-1 includes a CPU-bound job at 304-1, a memory-bound job at 304-2, and a CPU-bound job at 304-3. Queue 204-1 includes a compute bound job 304-1, a memory-bound job 304-2, and a compute bound job 304-3. Queue 204-1 may be overloaded in compute based jobs. Queue 204-2 includes a network-bound job at 304-4, a network-bound job at 304-5, and a network-bound job at 304-6. In this case, queue 204 may be overloaded with network-bound jobs. Queue 204-3 includes a network-bound job at 304-7, a CPU-bound job at 304-8, and a storage-bound job at 304-9. In this case, queue 204-3 is balanced in that no element is overloaded with jobs.

In one embodiment, to balance the jobs in queue 204-1, class-based scheduler 202 sends network-bound job 302-1 to queue 204-1. This balances the compute-bound jobs with a network-bound job. Also, since queue 204-2 includes all network-bound jobs, class-based scheduler 202 sends compute-bound job 302-2 to queue 204-2. Queue 204-3 includes a balanced number of classes of jobs and class-based scheduler 202 sends a memory-bound job 302-3 to queue 204-3 although any type of job may be sent to queue 302-3.

Figure 4:
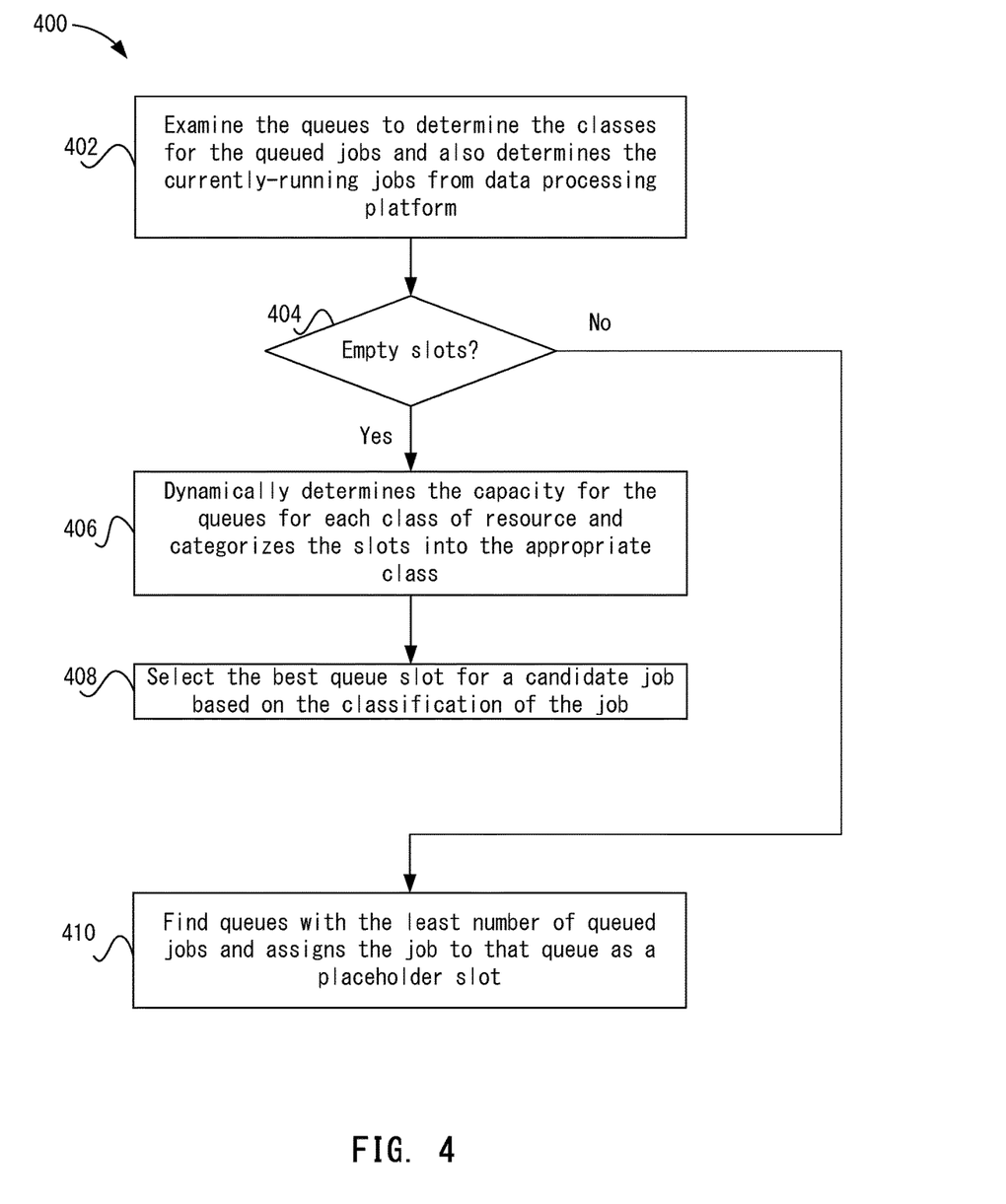
FIG. 4 depicts a flowchart of a method for scheduling jobs in queues 204 according to one embodiment.

FIG. 4 depicts a flowchart 400 of a method for scheduling jobs in queues 204 according to one embodiment. At 402, class-based scheduler 202 examines queues 204 to determine the classes for the queued jobs and also determines the currently-running jobs from data processing platform 106.

At 404, class-based scheduler 202 determines if there are any queues 204 with empty slots. For example, each queue may be able to queue a certain number of jobs. When a job is finished, the job is removed from the queue and a slot may open in the queue.

If there are empty slots in queues, at 406, class-based scheduler 202 dynamically determines the capacity for the queues for each class of resource and categorizes the slots into the appropriate class. For example, referring to FIG. 3, an empty slot in queue 204-1 may be classified as a network element class or a storage element class because the current jobs in queue 204 are compute element class jobs. Also, in one embodiment, the slots may be categorized with one or more eligible classes. The categorization is dynamic since the classification of running jobs may change in the queues and hence the categorization for slots may change. Particular embodiments use a dynamic balancing algorithm where the an optimally determined best mix of jobs in queues is obtained by adding jobs such that average resource utilization in platform 106 is high (e.g., more than 80%).

At 408, class-based scheduler 202 selects the best queue slot for a candidate job based on the classification of the job. For example, a network-bound job may be inserted into an open queue slot in queue 204-1 that is categorized in a network element class.

If there are no queues with empty slots, then class-based scheduler 202 may perform different actions. In one example, class-based scheduler 202 finds queues with the least number of queued jobs at 410 and assigns the job to that queue as a placeholder slot. The job may then be assigned to the queue when a slot opens up. Additionally, it is possible that this job may hop to another queue due to re-classification of current jobs or other slots in different queues open up. In other embodiments, class-based scheduler 202 may hold the job for scheduling at another time.

Re-Classification

Platform 106 may require several types of Quality of Service (QoS) metrics for the jobs. Class based scheduler 114 will perform certain admission tests to verify whether platform 106 can support the levels of QoS required. One test is the balancing of the class of jobs.

Even though the basic admission criteria is fulfilled, frequently it is found that once the platform 106 is scaled in terms of number of nodes, the amount of network traffic or amount of ingested data, the performance of the platform goes down. So continuous feedback from the compute, memory, network, and storage elements is analyzed in the analytics engine and consumption of resources is kept within the specifications the classes. As jobs are run, the jobs may use different amounts of resources, and in some cases, use more resources in a class that is different from the assigned class of that job. To efficiently assign jobs and use resources in platform 106, scheduler 114 may re-classify the jobs in the queues.

Figure 5:
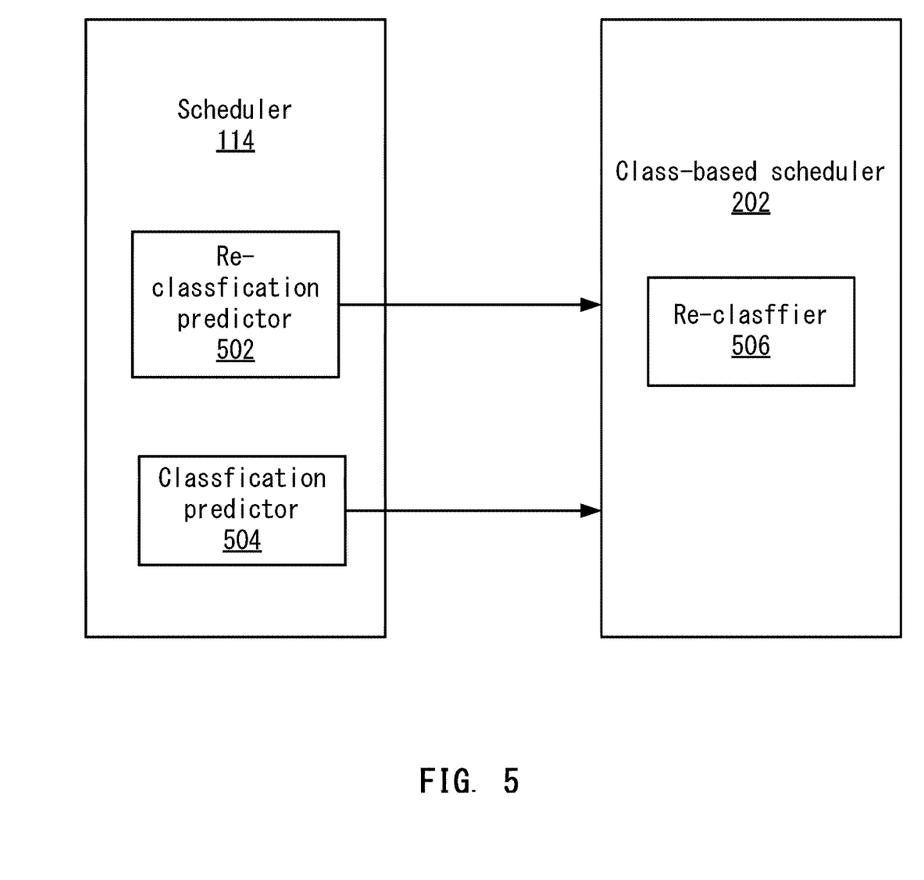
FIG. 5 depicts an example of the scheduler to perform a re-classification according to one embodiment.

In one example, when jobs are run, the jobs may be re-classified while they are present in the queues. This provides more accurate scheduling of newer jobs. Further, the re-classification may help to more accurately predict the classification of future jobs. FIG. 5 depicts an example of scheduler 114 to perform a re-classification according to one embodiment. Scheduler 114 includes a re-classification predictor 502 and a classification predictor 504.

Classification predictor 504 may be used to classify new jobs when the new jobs are not already assigned a classification via a lookup table using job characteristics. For example, classification predictor 504 may receive job characteristics as input for a new job and then output the classification. An example of job characteristics may include number of CPUs required, amount of RAM required, network bytes to transfer, and storage needed. Classification predictor 504 may then use a machine-learning predictor to predict the resource usage for the new job. For example, classification predictor 504 may predict that the new job may use "A" amount of network resources, "B" amount of compute resources, "C" amount of memory resources, and "D" amount of storage resources. Depending on the use, classification predictor 504 may classify the job. In a simple example, if a new job is classified as using the most compute resources, then the new job is classified as a CPU job. In one example, a job that has previously run is identified using a lookup mechanism where the key job characteristics, such as a number of platform operations, an aggregate CPU time per-platform operation, network bytes transferred, aggregate memory used per-operation, aggregate storage used per operation, are correlated to the infrastructure resource usage to generate a classification for the job. The number of platform operations are any operations performed by the job when executed, the CPU time is the amount of CPU used to perform the operations, the network bytes transferred is the amount of data transferred when executing the jobs, and the aggregate storage used is the amount of storage used by the operations to store data. The dominant resource used may be the resource that is determined to be used the most by operations for the job. By identifying a relative dominant resource a job is successfully classified as being in that resource class. The usage of each resource (CPU, memory, Network, Storage) over time as a percentage of total resources utilization at any given time predicts what class the job falls into and what the job's resource usage will be over time.

Once jobs start executing in data processing platform 106, agents 118 provide performance information to analytics engine 104. Analytics engine 104 may then generate applicable performance information, such as resources used over a recent time period, such as the last minute, and the progress of individual jobs in terms of number of operations completed. Once receiving the performance information, re-classification predictor 502 can then analyze the resources used and the progress of the job to determine if the current classification (a job may be re-classified many times) for the job should be changed. If a change occurs, re-classification predictor 502 provides the change to class-based scheduler 202. A re-classifier 506 then can change the classification for the job in queue 204. This may involve changing a label for the classification in memory. Thus, the classification may be changed dynamically while the job is being run.

Figure 6:
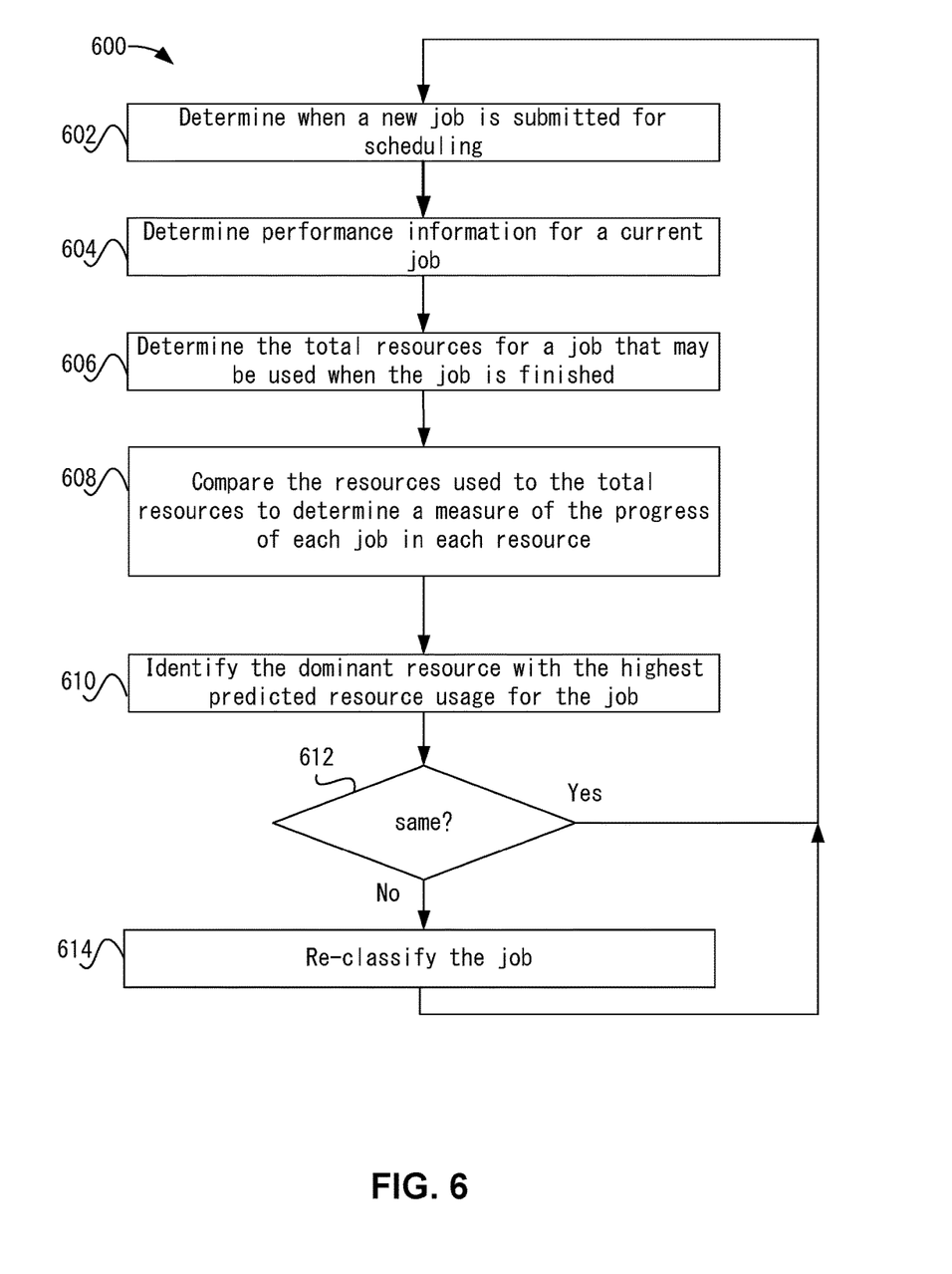
FIG. 6 depicts a simplified flowchart of a method for re-classifying current jobs according to one embodiment.

FIG. 6 depicts a simplified flowchart 600 of a method for re-classifying current jobs according to one embodiment. At 602, re-classification predictor 502 determines when a new job is submitted for scheduling. For example, a job may be re-classified when a new job is submitted for scheduling. In one embodiment, all jobs may be re-classified when a new job is submitted for scheduling, but not all current jobs need to be re-classified. In other embodiments, the current jobs may be re-classified periodically even when new jobs are not being submitted.

At 604, re-classification predictor 502 determines performance information for a current job. The performance information may include the consumption of resources. For example, the resources used may be equal to the number of memory bytes (memoryBytes), CPU time (CPUtime), network bytes (networkBytes) used, and storage bytes (storageBytes) used. The resources used may be found by the formula $resources_{used}$=(memoryBytes, CPUtime, networkBytes, storageBytes).

At 606, re-classification predictor 502 determines the total resources for a job that may be used when the job is finished. The total resources for a job may be determined by looking at the database of previous runs for jobs similar to this job. For example, the total resources may be measured by using the same variables as the used resources. The total resources may be determined as follows:

Total $resources_{job}$=(memoryBytes, CPUtime, networkBytes, storageBytes).

At 608, re-classification predictor 502 compares the resources used to the total resources to determine a measure of the progress of each job in each resource. For example, re-classification predictor 502 may use a decision tree whose levels are the most dominant operation to the least dominant operation and at each level a branching (e.g., 4-way) is applied on the feature space to finally arrive at a classification by the last level of the decision tree. This process will be described in more detail below.

At 610, re-classification predictor 502 identifies the dominant resource with the highest predicted resource usage for the job. This means that this job has an affinity to that resource in the near term. Thus, this resource is the dominant resource for the job and the job inherits that class.

At 612, re-classification predictor 502 determines if the resource with the highest predicted usage is the same as the current classification for the job. If not, at 614, re-classification predictor 502 re-classifies the job. However, if the classification is the same, then, re-classification predictor 502 does not need to change the class and the process reiterates to 602.

In one embodiment, re-classification predictor 502 uses a decision tree to perform the re-classification. The features that are used to classify a job are (CPU, RAM, Storage, Network) per platform operation. The decision tree has multiple levels and each level may have a weighting, which may be different for each level. Each level may correspond to an operation for the job. In one embodiment, higher levels of the decision tree towards the root level have operations that are used more by the job compared to lower levels. Re-classification predictor 502 traverses the decision tree analyzing operations at each level until a classification decision is made for the job.

In one example, given a set of operations (e.g., Map, Reduce, Shuffle, Merge) to be executed in a job at any stage of the processing, the frequency of each operation and the predicted cost of each operation where the cost is expressed as a cost vector is as follows:

num_maps=120, cost_map=(1200 cpu_milliseconds, 5 Gigabytes memory, 100 Gigabytes storage, 1 gigabytes networkBytes)
num_reduces=100, cost_reduce=(10000 cpu_milliseconds, 5 Gigabytes memory, 100 Gigabytes storage, 1 Gigabytes networkBytes)
num_shuffles=100, cost_shuffle=(100 cpu_milliseconds, 1 Gigabyte memory, 0 Gigabytes storage, 10 Gigabytes networkBytes)
num_merges=80, cost_merge=(10000 cpu_milliseconds, 1 Gigabytes memory, 10 Gigabytes storage, 0 Gigabytes network)

In the above, num_maps is the number of map operations, num_reduces is the number of reduce operations, num_shuffles is the number of shuffle operations, and num_merges is the number of merge operations. The number of operations is listed in the first position as "120" for map operations, 100 for reduce operations, 100 for shuffle operations, and 80 for merge operations. The cost for each operation is then listed as a function of compute (cpu use in milliseconds), memory (RAM usage in Gigabytes), storage (disk usage in Gigabytes), and network (data transferred in bytes) use.

Figure 7:
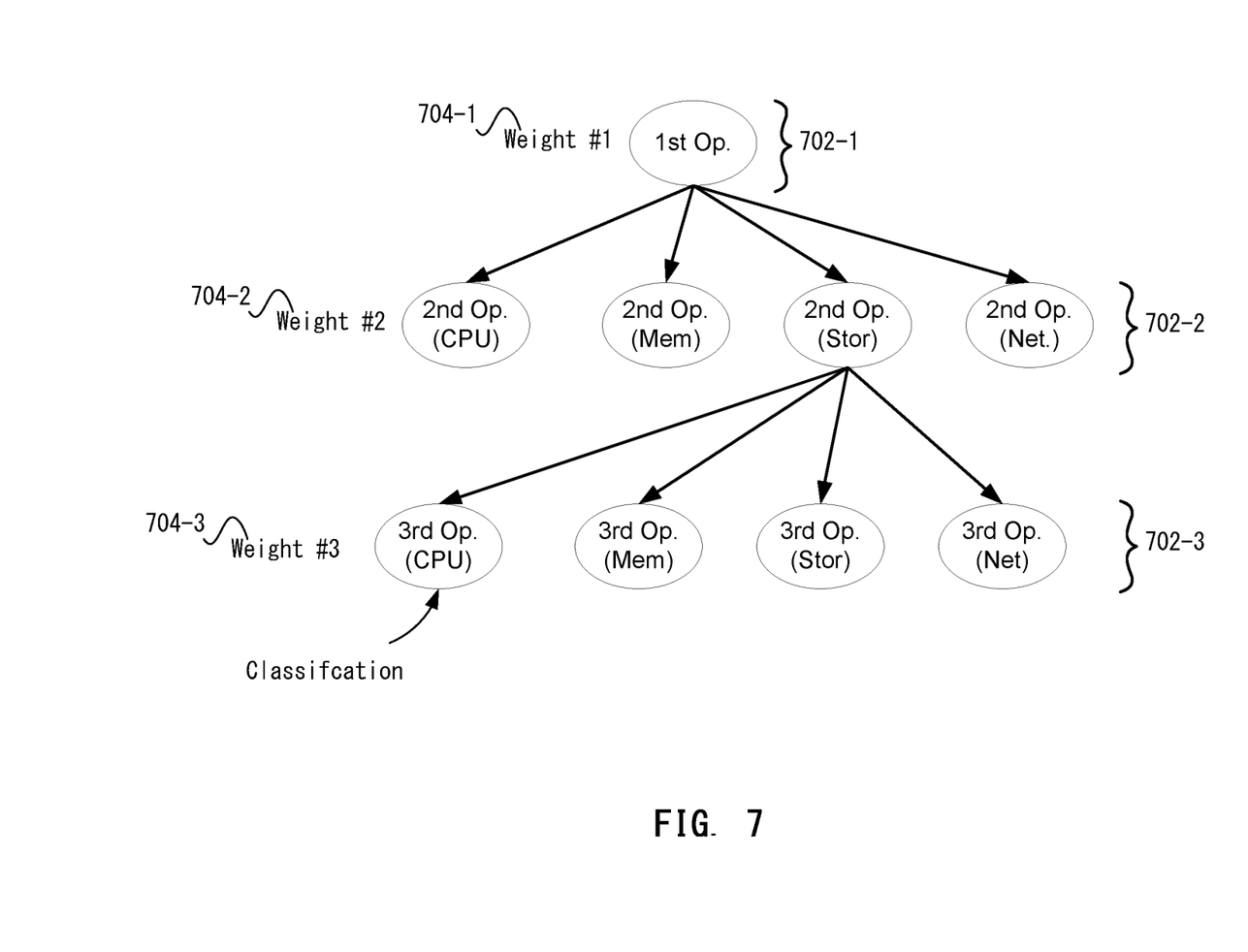
FIG. 7 depicts an example of a decision tree according to one embodiment.

FIG. 7 depicts an example of a decision tree 700 according to one embodiment. Different levels 702 are shown including a root level or first level 702-1, a second level 702-2, and a third level 702-3. Other levels may also be appreciated. Each level may also be associated with weights 704, such as a first weight 704-1 for first level 702-1, a second weight 704-2 for second level 702-2, and a third weight 704-3 for third level 702-3. The weights may have different values, such as 1, 0.8, and 0.6. The weights are applied to the cost vectors for the resources at each respective level.

In first level 702-1, re-classification predictor 502 evaluates the most dominant operation. This weight is arrived at by learning from training runs and prior predictions, and the weight 704-1 assigned to the dominant operation is W=1. Looking at the map operation, the cost vector is (1200 cpu_milliseconds, 5 Gigabytes memory, 100 Gigabytes storage, 1 gigabytes networkBytes). The weight of 1 does not change these values. Re-classification predictor 502 predicts the dominant resource for this dominant operation is storage. Re-classification predictor 502 looks at predicted capacity versus used capacity of each resource. So in this example, storage used is 120*100 Gigabytes=12 Terabytes. The other resources are similarly 120*1200=144 k cpu_milliseconds, 120*5=600 Gigabytes memory, and 120*1=120 Gigabytes network. The capacity of platform 106 may have values for CPU, memory, storage, and network. The resource that takes up the most percentage may be the dominant resource. In this case, storage of 12 Terabytes may be the highest percentage of utilization based on the total capacity of the system. Since storage is the dominant resource, the branch 706-3 is taken to the second level.

In second level 702-2, this is the next "heaviest" operation is reduce operations or shuffle operation. The weight 704-2 for reduce operations and merge operations is calculated based on training runs, such as weight 704-2 is identified using past history. In other embodiments, the weight may be the ratio of number of operations from the root level, which may be 100/120=0.83. The new cost vector for reduce operations is New_cost_vector=0.8*(10000 cpu_milliseconds, 5 Gigabytes memory, 100 Gigabytes storage, 1 Gigabytes networkBytes)=(8000 cpu_milliseconds, 4 Gbytes memory, 80 Gigabytes storage, 0.8 Gigabytes networkBytes). In this case, the CPU usage for the reduce operation is 100*8000=800,000 cpu_milliseconds is the largest between the reduce and shuffle operations. This value may be a higher percentage capacity usage of CPU than storage from first level 702-1. Accordingly, this job is classified as a CPU-bound job. On the same level, re-classification predictor 502 also evaluates the shuffle operation. The new cost vector for shuffle operations is New_cost_vector=0.8*(100 cpu_milliseconds, 1 Gigabyte memory, 0 Gigabytes storage, 10 Gigabytes, 10 Gigabytes networkBytes)=(80 cpu_milliseconds, 0.8 Gigabyte memory, 0 Gigabytes storage, 8 Gigabytes networkBytes). In this case, re-classification predictor 502 determines that the classification is not changed because the values for shuffle operations are not a larger usage from the shuffle operation.

In third level 702-3, the weight is 0.6 and the new cost vector for merge operations is new_cost_vector=0.6*(10000 cpu_milliseconds, 1 Gigabytes memory, 10 Gigabytes storage, 0 Gigabytes network)=(6000 cpu_milliseconds, 0.6 Gigabytes memory, 6 Gigabytes storage, 0 Gigabytes network). In this case, re-classification predictor 502 determines that the classification does not change because these capacity utilization numbers are not greater than the CPU usage from the reduce operation.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
selecting, by a computing device, a new job to schedule for execution on a data processing system, the new job including a classification in a plurality of classifications, wherein the classification is determined by:
using a process to analyze a set of operations to determine which operation is to be used to classify the current job, wherein a first operation in the set of operations is selected; and
classifying the first operation in a first classification based on resource usage for the first operation, wherein the first classification is determined based on a resource being used by the first operation in a highest percentage usage in the data processing platform compared to other resources used by the first operation;
retrieving, by the computing device, performance information for a set of current jobs that are being executed in the data processing system, wherein the set of jobs are assigned to a plurality of queues and currently classified with a current classification in the plurality of classifications;
analyzing, by the computing device, the performance information to determine when one or more current jobs in the set of current jobs should be re-classified due to resource usage of a respective current job when being executed in the data processing system, wherein analyzing comprises:
determining a second operation in the set of operations; and
determining that the first classification should be changed to the second classification when a resource being used by the second operation has a higher percentage usage in the data processing platform compared to the highest percentage usage for the first operation;
re-classifying, by the computing device, the classifications for the one or more current jobs in the plurality of queues, wherein the first classification is re-classified to the second classification for the first operation; and
assigning, by the computing device, the new job to one of the queues based on the classification of the new job and the classifications of jobs in the plurality of queues including the re-classified classifications for the one or more current jobs.

2. The method of claim 1, further comprising:
receiving the performance information from a plurality of agents installed on data processing devices in the data processing system, the plurality of agents associated resource usage on the data processing devices with current jobs being executed on respective data processing devices.

3. The method of claim 2, wherein the performance information is analyzed to generate resource usage for the plurality of classifications per current job.

4. The method of claim 1, further comprising:
selecting a classification for the new job based on job characteristics associated with the new job.

5. The method of claim 4, wherein selecting the classification comprises:
training a predictor to predict classifications; and
inputting the job characteristics into the predictor to automatically predict the classification for the new job.

6. The method of claim 1, wherein analyzing the performance information comprises:
training a predictor to predict classifications for the set of current jobs; and
inputting the performance information into the predictor to automatically predict the classification for the set of current jobs.

7. The method of claim 1, wherein analyzing the performance information comprises:
applying a first weight to the resource usage for the first operation; and
applying a second weight to the resource usage for the second operation, wherein the first weight is higher than the second weight.

8. The method of claim 1, wherein assigning the new job comprises:
determining which classifications are included in each of the plurality of queues for current jobs in each of the plurality of queues; and
assigning the new job to the one of the queues based on an open slot in the one of the queues having a same classification as the new job.

9. The method of claim 1, further comprising:
assigning classifications to open slots in the plurality of queues based on the re-classifying, the assigning of the classifications to the open slots based on a balancing algorithm of the plurality of classifications in the plurality of queues.

10. The method of claim 1, further comprising:
changing a current job in a first queue in the plurality of queues to a second queue in the plurality of queues after the re-classifying, wherein the changing is performed when the second queue includes less jobs with the classification for the current queue than the first queue.

11. A non-transitory computer-readable storage medium containing instructions, that when executed, control a computer system to be configured for:
selecting a new job to schedule for execution on a data processing system, the new job including a classification in a plurality of classifications, wherein the classification is determined by:
using a process to analyze a set of operations to determine which operation is to be used to classify the current job, wherein a first operation in the set of operations is selected; and
classifying the first operation in a first classification based on resource usage for the first operation, wherein the first classification is determined based on a resource being used by the first operation in a highest percentage usage in the data processing platform compared to other resources used by the first operation;
retrieving performance information for a set of current jobs that are being executed in the data processing system, wherein the set of jobs are assigned to a plurality of queues and currently classified with a current classification in the plurality of classifications;
analyzing the performance information to determine when one or more current jobs in the set of current jobs should be re-classified due to resource usage of a respective current job when being executed in the data processing system, wherein analyzing comprises:
determining a second operation in the set of operations; and
determining that the first classification should be changed to the second classification when a resource being used by the second operation has a higher percentage usage in the data processing platform compared to the highest percentage usage for the first operation;

re-classifying the classifications for the one or more current jobs in the plurality of queues, wherein the first classification is re-classified to the second classification for the first operation; and assigning the new job to one of the queues based on the classification of the new job and the classifications of jobs in the plurality of queues including the re-classified classifications for the one or more current jobs.

12. The non-transitory computer-readable storage medium of claim 11, wherein analyzing the performance information comprises:

applying a first weight to the resource usage for the first operation; and applying a second weight to the resource usage for the second operation, wherein the first weight is higher than the second weight.

13. The non-transitory computer-readable storage medium of claim 11, wherein assigning the new job comprises:

determining which classifications are included in each of the plurality of queues for current jobs in each of the plurality of queues; and assigning the new job to the one of the queues based on an open slot in the one of the queues having a same classification as the new job.

14. The non-transitory computer-readable storage medium of claim 11, wherein analyzing the performance information comprises:

determining a set of operations being performed by a current job;

using a process to analyze the set of operations to determine which operation is to be used to classify the current job; and classifying the current job based on resource usage for the determined operation.

15. The non-transitory computer-readable storage medium of claim 11, further configured for:

assigning classifications to open slots in the plurality of queues based on the re-classifying, the assigning of the classifications to the open slots based on a balancing algorithm of the plurality of classifications in the plurality of queues.

16. The non-transitory computer-readable storage medium of claim 11, further configured for:

changing a current job in a first queue in the plurality of queues to a second queue in the plurality of queues after the re-classifying, wherein the changing is performed when the second queue includes less jobs with the classification for the current queue than the first queue.

17. The non-transitory computer-readable storage medium of claim 11, further configured for:

selecting a classification for the new job based on job characteristics associated with the new job.

18. The non-transitory computer-readable storage medium of claim 11, wherein analyzing the performance information comprises:

training a predictor to predict classifications for the set of current jobs; and inputting the performance information into the predictor to automatically predict the classification for the set of current jobs.

19. The non-transitory computer-readable storage medium of claim 11, further configured for:

receiving the performance information from a plurality of agents installed on data processing devices in the data processing system, the plurality of agents associated resource usage on the data processing devices with current jobs being executed on respective data processing devices.

20. An apparatus comprising:

one or more computer processors; and a non-transitory computer-readable storage medium comprising instructions, that when executed, control the one or more computer processors to be configured for:

selecting a new job to schedule for execution on a data processing system, the new job including a classification in a plurality of classifications, wherein the classification is determined by:

using a process to analyze a set of operations to determine which operation is to be used to classify the current job, wherein a first operation in the set of operations is selected; and classifying the first operation in a first classification based on resource usage for the first operation, wherein the first classification is determined based on a resource being used by the first operation in a highest percentage usage in the data processing platform compared to other resources used by the first operation;

retrieving performance information for a set of current jobs that are being executed in the data processing system, wherein the set of jobs are assigned to a plurality of queues and currently classified with a current classification in the plurality of classifications;

analyzing the performance information to determine when one or more current jobs in the set of current jobs should be re-classified due to resource usage of a respective current job when being executed in the data processing system, wherein analyzing comprises:

determining a second operation in the set of operations; and determining that the first classification should be changed to the second classification when a resource being used by the second operation has a higher percentage usage in the data processing platform compared to the highest percentage usage for the first operation;

re-classifying the classifications for the one or more current jobs in the plurality of queues, wherein the first classification is re-classified to the second classification for the first operation; and assigning the new job to one of the queues based on the classification of the new job and the classifications of jobs in the plurality of queues including the re-classified classifications for the one or more current jobs.

* * * * *